United States Patent
Hatfield

(10) Patent No.: US 12,001,460 B2
(45) Date of Patent: Jun. 4, 2024

(54) PERFORMING A WRITE-PRIORITIZED TREE COPY

(71) Applicant: International Business Machines Corporation, Armonk, NY (US)

(72) Inventor: Brian David Hatfield, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 16/535,950

(22) Filed: Aug. 8, 2019

(65) Prior Publication Data
US 2021/0042336 A1 Feb. 11, 2021

(51) Int. Cl.
G06F 16/31 (2019.01)
G06F 3/06 (2006.01)
G06F 16/18 (2019.01)

(52) U.S. Cl.
CPC .......... *G06F 16/322* (2019.01); *G06F 3/0614* (2013.01); *G06F 3/065* (2013.01); *G06F 3/067* (2013.01); *G06F 16/1873* (2019.01)

(58) Field of Classification Search
CPC ..... Y10S 707/99954; Y10S 707/99955; G06F 16/2365; G06F 2201/84; G06F 3/065; G06F 16/22; G06F 12/1466; G06F 16/2246; G06F 16/322; G06F 2009/45583; G06F 2209/5021; G06F 16/1873; G06F 3/0614; G06F 3/067
See application file for complete search history.

(56) References Cited

U.S. PATENT DOCUMENTS

| | | | |
|---|---|---|---|
| 7,293,028 B2 | 11/2007 | Cha et al. | |
| 7,577,658 B2 | 8/2009 | Graefe | |
| 8,412,689 B2 | 4/2013 | Reid et al. | |
| 8,666,981 B2 | 3/2014 | Liedes | |
| 9,208,258 B2 | 12/2015 | Spillane et al. | |
| 9,361,332 B2 | 6/2016 | Benjamin-Deckert et al. | |
| 9,875,270 B1 | 1/2018 | Muniswamy Reddy et al. | |
| 2003/0033328 A1* | 2/2003 | Cha | G06F 16/2329 707/999.202 |
| 2006/0271606 A1* | 11/2006 | Tewksbary | G06F 16/172 707/999.203 |
| 2008/0005199 A1* | 1/2008 | Chen | G06F 16/275 707/999.204 |
| 2013/0036332 A1* | 2/2013 | Gove | G06F 21/52 714/54 |
| 2018/0157697 A1* | 6/2018 | Brown | G06F 16/27 707/999.003 |

* cited by examiner

*Primary Examiner* — Yuk Ting Choi
(74) *Attorney, Agent, or Firm* — Zilka-Kotab, P.C.

(57) ABSTRACT

A computer-implemented method according to one embodiment includes obtaining a first latch for a first node within a tree data structure; copying a first version number of the first node; unlatching the first node; copying the first node; latching the first node a second time after completing the copying; copying a second version number of the first node; and performing one or more actions in response to a comparison of the first version number and the second version number.

19 Claims, 6 Drawing Sheets

PERFORMING A WRITE-PRIORITIZED TREE COPY

BACKGROUND

The present invention relates to data storage, and more specifically, this invention relates to performing a copy of a tree data structure.

Tree data structures are commonly used for the organization and storage of data. In order to perform a checkpoint or snapshot of a tree data structure, the tree data structure may be copied. However, current tree copy operations do not appropriately prioritize and manage updates that are made to the tree during the copy operation, which results in unnecessary complexity and resource utilization.

SUMMARY

A computer-implemented method according to one embodiment includes obtaining a first latch for a first node within a tree data structure; copying a first version number of the first node; unlatching the first node; copying the first node; latching the first node a second time after completing the copying; copying a second version number of the first node; and performing one or more actions in response to a comparison of the first version number and the second version number.

According to another embodiment, a computer program product for performing a write-prioritized tree copy includes a computer readable storage medium having program instructions embodied therewith, where the computer readable storage medium is not a transitory signal per se, and where the program instructions are executable by a processor to cause the processor to perform a method including obtaining, by the processor, a first latch for a first node within a tree data structure; copying, by the processor, a first version number of the first node; unlatching, by the processor, the first node; copying, by the processor, the first node; latching, by the processor, the first node a second time after completing the copying; copying, by the processor, a second version number of the first node; and performing, by the processor, one or more actions in response to a comparison of the first version number and the second version number.

According to another embodiment, a system includes a processor; and logic integrated with the processor, executable by the processor, or integrated with and executable by the processor, where the logic is configured to obtain a first latch for a first node within a tree data structure; copy a first version number of the first node; unlatching the first node; copy the first node; latch the first node a second time after completing the copying; copy a second version number of the first node; and perform one or more actions in response to a comparison of the first version number and the second version number.

Other aspects and embodiments of the present invention will become apparent from the following detailed description, which, when taken in conjunction with the drawings, illustrate by way of example the principles of the invention.

DETAILED DESCRIPTION

Figure 1:
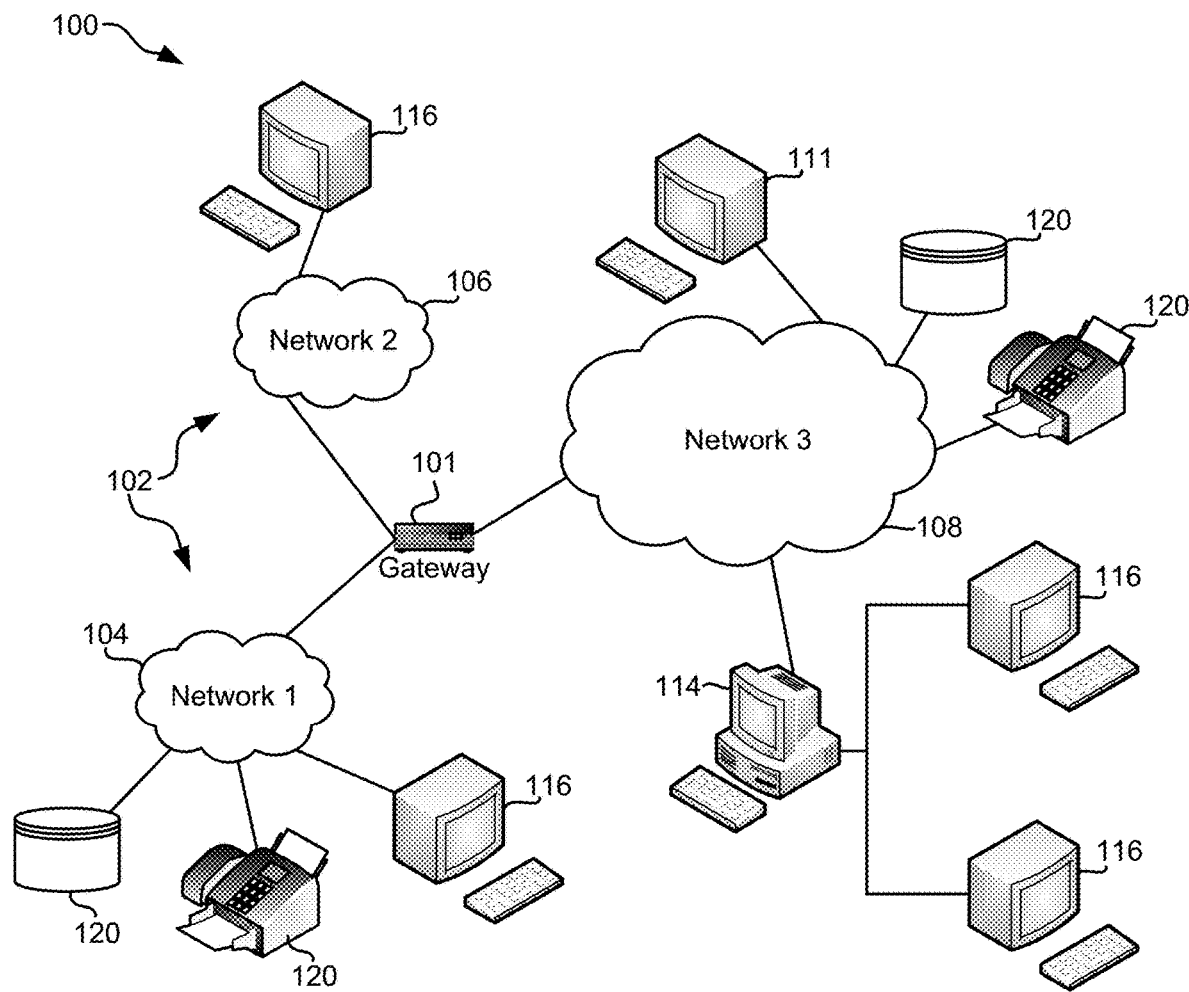
FIG. 1 illustrates a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing a write-prioritized tree copy.

In one general embodiment, a computer-implemented method includes obtaining a first latch for a first node within a tree data structure; copying a first version number of the first node; unlatching the first node; copying the first node; latching the first node a second time after completing the copying; copying a second version number of the first node; and performing one or more actions in response to a comparison of the first version number and the second version number.

In another general embodiment, a computer program product for performing a write-prioritized tree copy includes a computer readable storage medium having program instructions embodied therewith, where the computer readable storage medium is not a transitory signal per se, and where the program instructions are executable by a processor to cause the processor to perform a method including obtaining, by the processor, a first latch for a first node within a tree data structure; copying, by the processor, a first version number of the first node; unlatching, by the processor, the first node; copying, by the processor, the first node; latching, by the processor, the first node a second time after completing the copying; copying, by the processor, a second version number of the first node; and performing, by the processor, one or more actions in response to a comparison of the first version number and the second version number.

In another general embodiment, a system includes a processor; and logic integrated with the processor, executable by the processor, or integrated with and executable by the processor, where the logic is configured to obtain a first latch for a first node within a tree data structure; copy a first version number of the first node; unlatching the first node; copy the first node; latch the first node a second time after completing the copying; copy a second version number of the first node; and perform one or more actions in response to a comparison of the first version number and the second version number.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
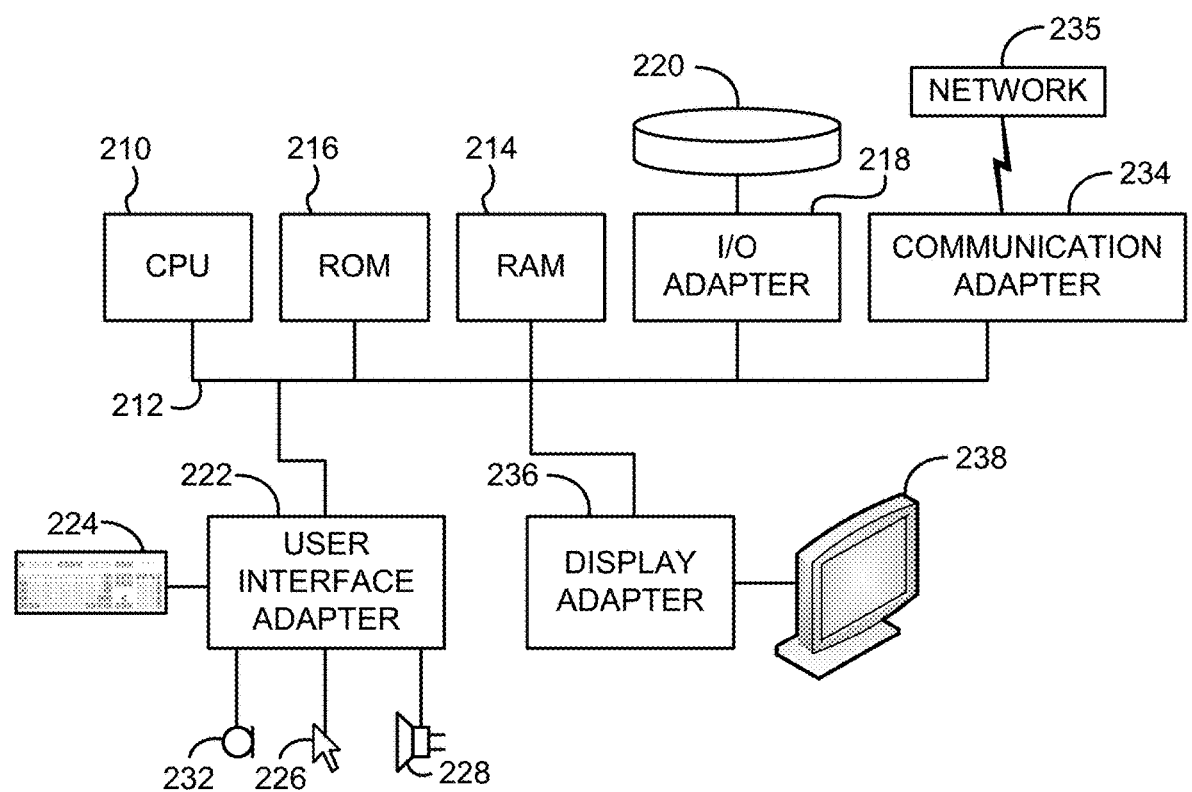
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
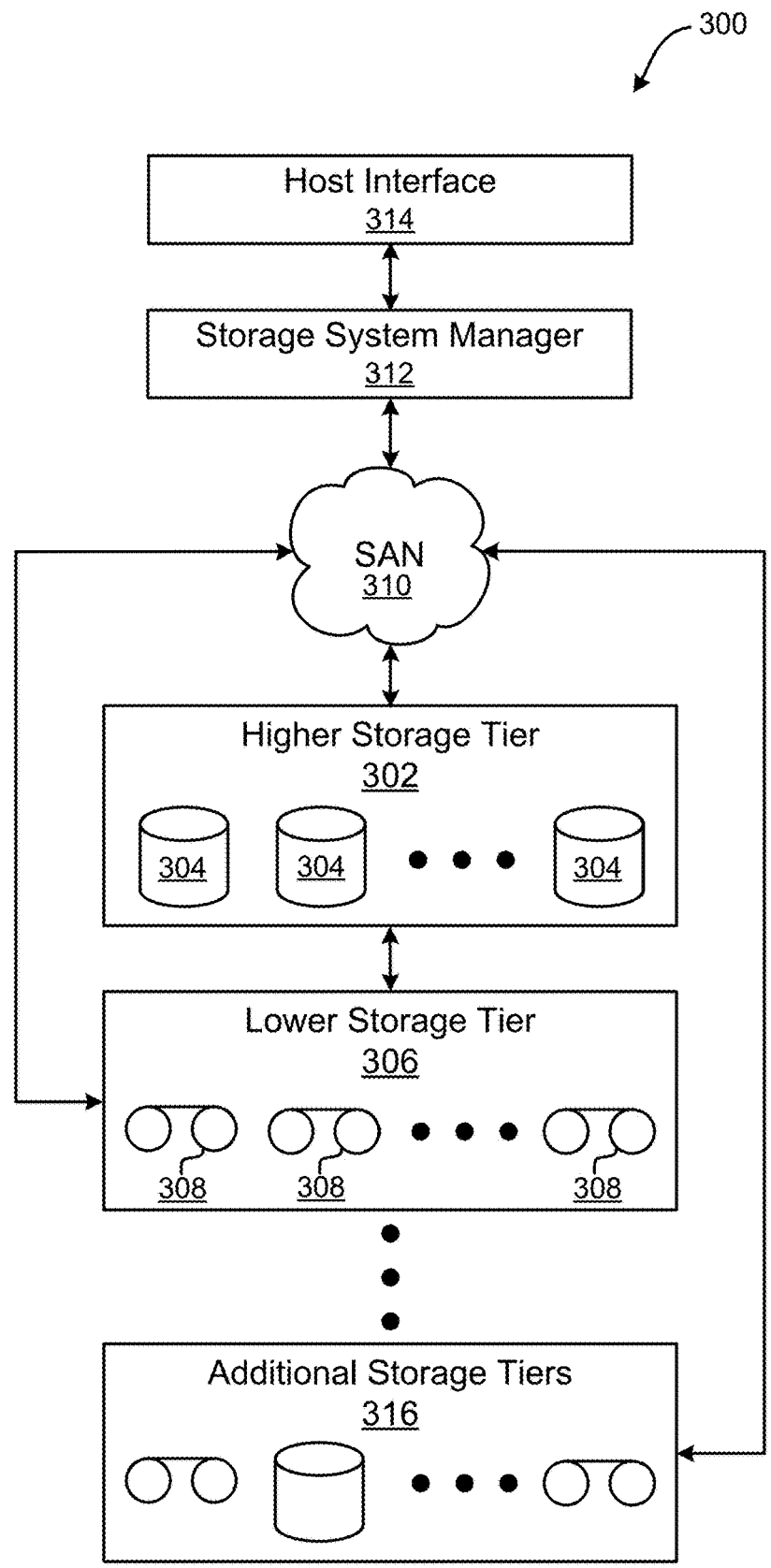
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
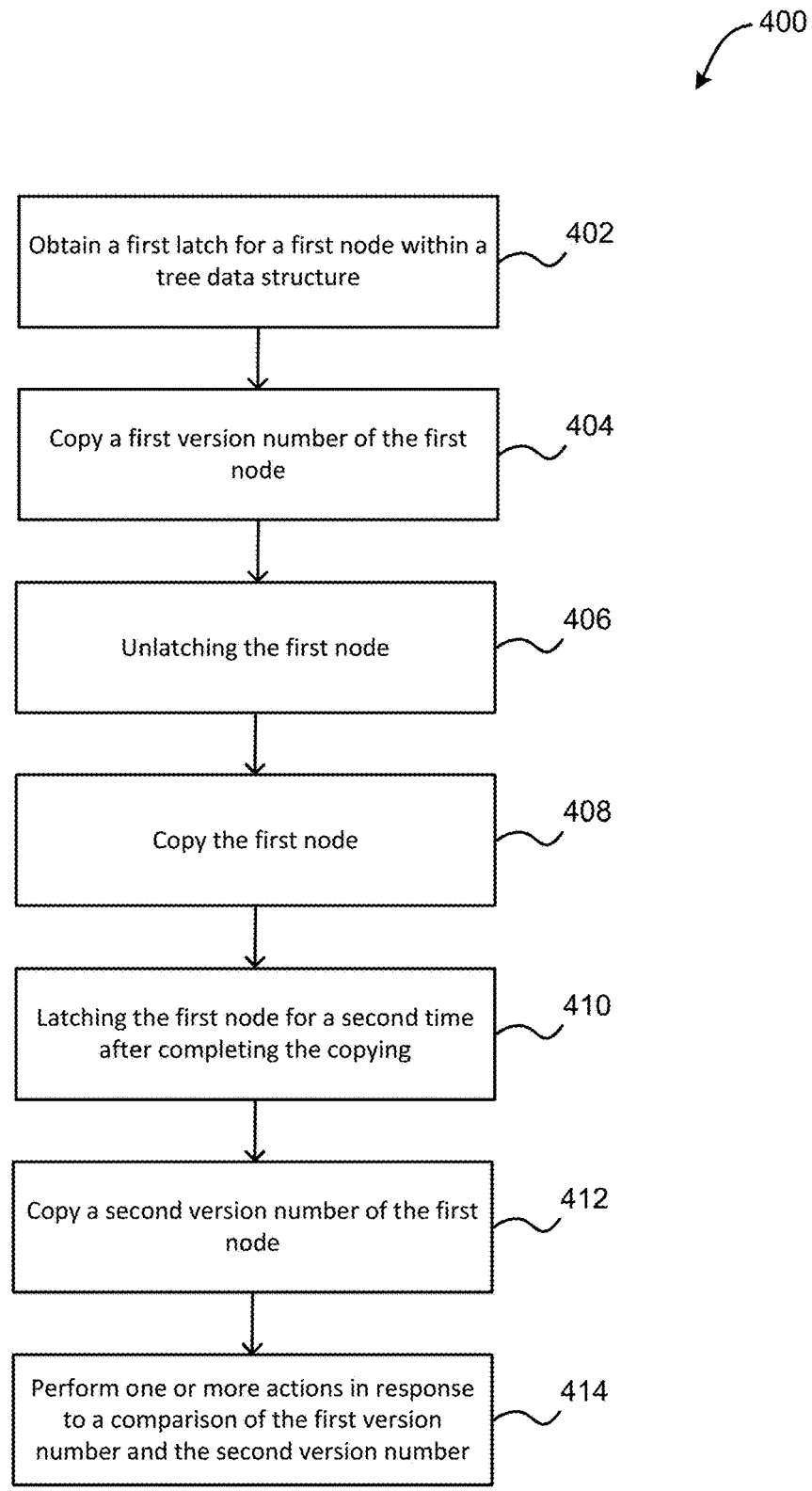
FIG. 4 illustrates a method for performing a write-prioritized tree copy, in accordance with one embodiment of the present invention.

Now referring to FIG. 4, a flowchart of a method 400 is shown according to one embodiment. The method 400 may be performed in accordance with the present invention in any of the environments depicted in FIGS. 1-3, among others, in various embodiments. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a first latch is obtained for a first node within a tree data structure. In one embodiment, the tree data structure may include a data structure including a plurality of nodes that are used for the storage of sorted data. For example, the data may include numerical data, audio data, video data, or any other type of data. In another example, the tree data structure may store the sorted data in a plurality of nodes in a predefined, organized manner (e.g., utilizing a root node, one or more parent nodes, one or more child nodes, one or more leaf nodes, etc.). In yet another example, the tree data structure may enable retrieval of data in logarithmic time.

Additionally, in one embodiment, the first node may include a root node of the tree data structure, a parent node within the tree data structure, a child node within the tree data structure, a leaf node within the tree data structure, etc. In another embodiment, the first latch may be obtained in response to receiving a request to copy the tree data structure. In yet another embodiment, the first latch may be obtained by a predetermined operation (e.g., a snapshot/checkpoint operation, etc.).

For example, copying the tree data structure may include creating a duplicate of the tree data structure as well as all data stored within the tree data structure (e.g., all data stored within all nodes of the tree data structure, etc.) in a second location separate from a first location where the tree data structure is stored. In another example, copying the tree data structure may include serializing the tree data structure (e.g., reformatting the tree data structure into a different serialized data structure that includes all sorted data within the tree data structure). For instance, the serialized data structure may be parsed and converted back into the tree data structure.

In another example, the copy of the tree data structure may be used as a backup to restore to in case of future problems with the tree data structure (e.g., corrupted data, malware, etc.).

Further, in one embodiment, the first latch may include a shared latch. For example, the first latch may include a shared lock for the first node. In another example, the first latch may be for only the first node and not for the entire tree data structure. In yet another example, the first latch may include a shared latch that allows multiple concurrent readers. In another embodiment, the shared latch may enable additional users to obtain additional shared latches to read data from the first node (e.g., by obtaining additional shared latches on the first node while the first latch is obtained), but may prevent an exclusive latch from being obtained for the first node (e.g., which prevents writing to the node when the shared latch is held).

Further still, method 400 may proceed with operation 404, where a first version number of the first node is copied. In one embodiment, the first version number may include a current version number stored within the first node prior to copying the first node. In another embodiment, the first version number may include metadata stored within the first node. In yet another embodiment, the first version number may include a numeric value, a date and/or time a last update was made to the node (e.g., to data of the node), etc.

Also, in one embodiment, copying the first version number may include identifying the first version number at a first storage location where the first version number is stored within the node, and creating a copy of the first version number at a second storage location different from the first storage location. In another embodiment, the first latch may be obtained atomically on a processor. For example, an atomic copy may be performed on the first version number.

In addition, method 400 may proceed with operation 406, where the first node is unlatched. For example, a first latch may be removed for the first node. In one embodiment, the first latch may be removed from the first node immediately after copying the first version number. In this way, data within the first node may be updated or read. In another embodiment, the memory location containing the latch may or may not be freed in response to the unlatching of the first node.

Furthermore, method 400 may proceed with operation 408, where the first node is copied. In one embodiment, the first node may be copied in an unlatched manner. For example, the first node may be copied without a latch being held on the first node during the copy. In this way, data within the first node may be updated during the copy. In another embodiment, copying the first node may include creating a copy of all data stored within the first node. In yet another embodiment, copying the first node may include creating a copy of the first node within a copy of the tree data structure.

Further still, method 400 may proceed with operation 410, where the first node is latched a second time after completing the copying. For example, a second latch may be obtained for the first node. In one embodiment, the second latch may be obtained in a manner similar to obtaining the first latch. In another embodiment, the second latch may be obtained by a predetermined operation (e.g., a snapshot/checkpoint operation, etc.).

Also, method 400 may proceed with operation 412, where a second version number of the first node is copied. In one embodiment, the second version number may include a current version number stored within the first node after the copying of the first node has been completed. For example, during the copying of the first node, an exclusive latch may be obtained for the first node, and the node may be updated. In another example, the version number of the first node may be incremented after the updating of the first node.

Additionally, in one embodiment, the second version number may include metadata stored within the first node. In another embodiment, the second version number may include a numeric value, a date and/or time a last update was made to the node (e.g., to data of the node), etc. In yet another embodiment, copying the second version number may include identifying the second version number at a first storage location where the second version number is stored within the node, and creating a copy of the second version number at a second storage location different from the first storage location.

Further, in one embodiment, the second latch may be obtained atomically on a processor. For example, an atomic copy may be performed on the second version number. In another embodiment, the second latch may be maintained after the copying of the second version number.

Further still, method 400 may proceed with operation 414, where one or more actions are performed in response to a comparison of the first version number and the second version number. In one embodiment, in response to determining that the first version number matches the second version number, the copying of the first node may be determined to be complete. For example, the first version number may match the second version number when the first node has not been updated during the copying of the first node. In another example, the snapshot/checkpoint operation may proceed to a second node within the tree data structure (e.g., according to a predetermined tree traversal order, etc.), in response to determining that the first version number matches the second version number.

Also, in one embodiment, in response to determining that the first version number does not match the second version number, the copying of the first node may be determined to be incomplete. In another embodiment, the first version number may not match the second version number when the first node has been updated during the copying of the first node. In yet another embodiment, the snapshot/checkpoint operation may re-copy the first node within the tree data structure (e.g., in the manner indicated above, etc.), in response to determining that the first version number does not match the second version number.

In this way, update operations may be prioritized over copy operations, which may enable the copying of a tree data structure while it is being used (e.g., read from, written to, etc.). Additionally, the copying of the tree data structure may be performed in a time and resource-efficient manner that avoids waiting for copy operations to the tree data structure to complete before performing writes to nodes of the tree data structure. This also avoids aborting (and later re-initiating) lower-priority work (such as copying) for higher-priority work (e.g., writing to nodes within the tree data structure). This may in turn improve a performance of one or more computing devices performing the copying of the tree data structure.

Figure 5:
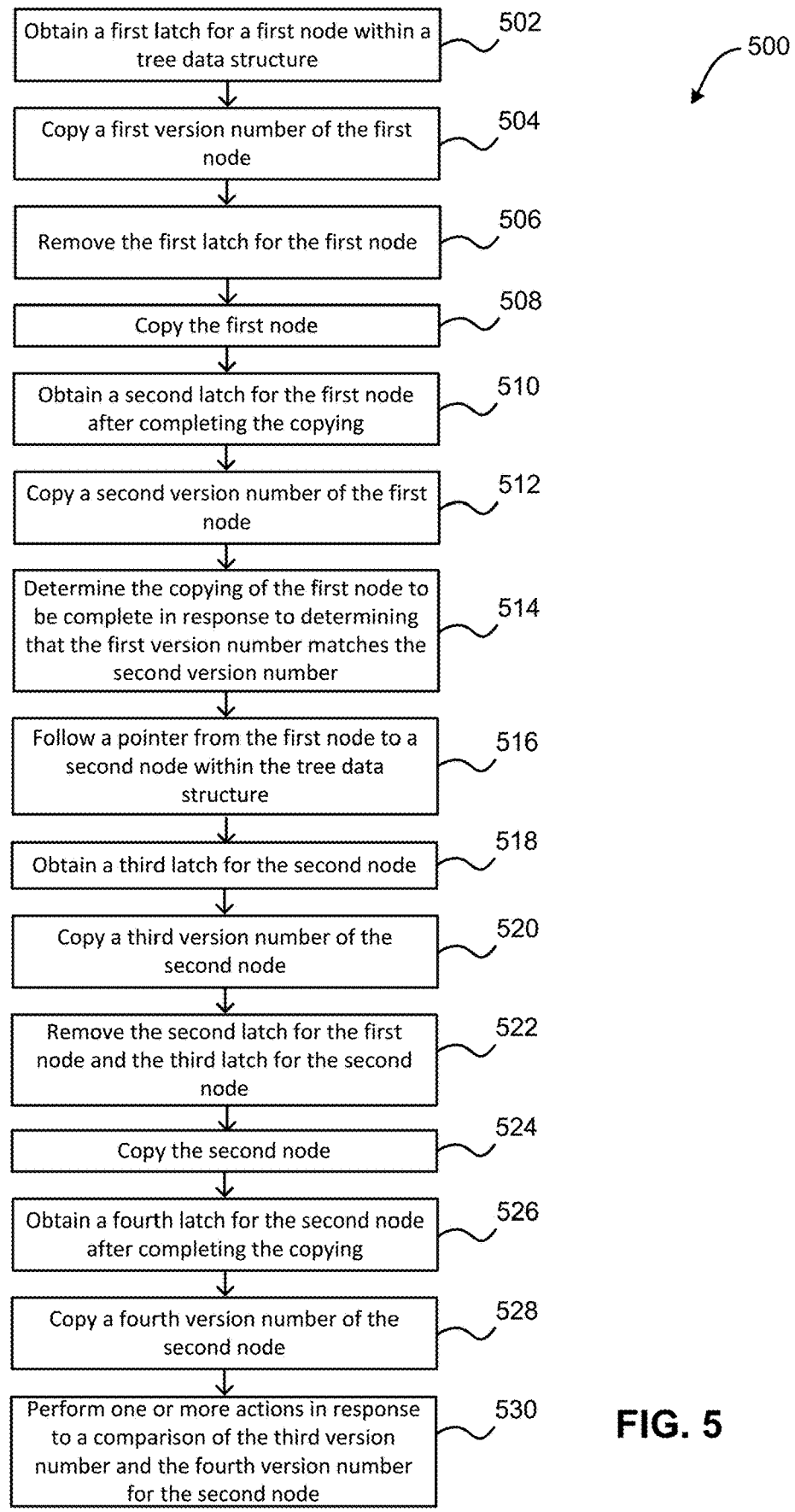
FIG. 5 illustrates a method for traversing a tree data structure during a tree copy, in accordance with one embodiment of the present invention.

Now referring to FIG. 5, a flowchart of a method 500 for traversing a tree data structure during a tree copy is shown according to one embodiment. The method 500 may be performed in accordance with the present invention in any of the environments depicted in FIGS. 1-3, among others, in various embodiments. Of course, greater or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a first latch is obtained for a first node within a tree data structure. Additionally, method 500 may proceed with operation 504, where a first version number of the first node is copied. Further, method 500 may proceed with operation 506, where the first latch is removed for the first node. Also, method 400 may proceed with operation 508, where the first node is copied. Further still, method 500 may proceed with operation 510, where a second latch is obtained for the first node after completing the copying. Also, method 500 may proceed with operation 512, where a second version number of the first node is copied.

In addition, method 500 may proceed with operation 514, where in response to determining that the first version number matches the second version number, the copying of the first node is determined to be complete. Furthermore, method 500 may proceed with operation 516, where a pointer is followed from the first node to a second node within the tree data structure.

Furthermore, in one embodiment, the second latch may be maintained on the first node while the pointer is identified, retrieved, and followed by the snapshot/checkpoint operation. In another embodiment, each node within the tree data structure may include a pointer (e.g., as metadata, etc.) that indicates a next/subsequent node within the tree data structure (e.g., a successor node of a predetermined traversal of the tree data structure, etc.).

Further still, method 500 may proceed with operation 518, where a third latch is obtained for the second node. In one embodiment, the third latch may be obtained in a manner similar to obtaining the first and second latches. In another embodiment, the third latch may be obtained by a predetermined operation (e.g., a snapshot/checkpoint operation, etc.).

Also, method 500 may proceed with operation 520, where a third version number of the second node is copied. In one embodiment, the third version number may include a current version number stored within the second node prior to copying the second node. In another embodiment, the third version number may include metadata stored within the second node. In yet another embodiment, the third version number may include a numeric value, a date and/or time a last update was made to the node (e.g., to data of the node), etc.

Additionally, in one embodiment, copying the third version number may include identifying the third version number at a first storage location where the third version number is stored within the node, and creating a copy of the third version number at a second storage location different from the first storage location. In another embodiment, the third latch may be obtained atomically on a processor. For instance, an atomic copy may be performed on the third version number.

Further, method 500 may proceed with operation 522, where the second latch for the first node and the third latch for the second node are removed. In one embodiment, the second latch may be removed from the first node immediately after obtaining the third latch for the second node. In another embodiment, the third latch may be removed from the first node immediately after copying the third version number.

Further still, method 500 may proceed with operation 524, where the second node is copied. In one embodiment, the second node may be copied in a manner similar to the first node.

Also, method 500 may proceed with operation 526, where a fourth latch is obtained for the second node after completing the copying. In one embodiment, the fourth latch may be obtained in a manner similar to obtaining the first, second, and third latches. In another embodiment, the fourth latch may be obtained by a predetermined operation (e.g., a snapshot/checkpoint operation, etc.).

In addition, method 500 may proceed with operation 528, where a fourth version number of the second node is copied. In one embodiment, the fourth version number may include a current version number stored within the second node after the copying of the second node has been completed. In another embodiment, the fourth version number may be copied in a manner similar to the copying of the third version number.

Furthermore, method 500 may proceed with operation 530, where one or more actions are performed in response to a comparison of the third version number and the fourth version number for the second node. In one embodiment, in response to determining that the third version number matches the fourth version number, the copying of the second node may be determined to be complete. For example, the third version number may match the fourth version number when the second node has not been updated during the copying of the second node. In another example, the snapshot/checkpoint operation may proceed to a third node within the tree data structure (e.g., according to a predetermined tree traversal order, etc.), in response to determining that the third version number matches the fourth version number.

Further still, in one embodiment, in response to determining that the third version number does not match the fourth version number, the copying of the second node may be determined to be incomplete. For example, the third version number may not match the fourth version number when the second node has been updated during the copying of the second node. In another example, the snapshot/checkpoint operation may re-copy the second node within the tree data structure (e.g., in the manner indicated above, etc.), in response to determining that the third version number does not match the fourth version number.

Also, in one embodiment, the above copy operations may be performed for all nodes within the tree-structure. In this way, a tree data structure may be copied in an efficient manner without write conflicts to nodes of the tree (e.g., by other applications, etc.). By avoiding write conflicts and aborted copy operations, resources utilized by one or more computing devices performing the tree data structure copy may be minimized, which may improve a performance of such computing devices.

Additionally, in one embodiment, node coalescing and node splitting within the tree data structure may be managed during the copying of nodes within the tree data structure. In one embodiment, node coalescing includes merging two nodes to become a single node within the tree data structure. In another embodiment, of the nodes is removed from the tree as a result. In yet another embodiment, a split or a coalesce will result in an updated version number for nodes that are split or coalesced, which will prompt the re-copying of the node in cases of a right sibling coalesce or split. In still another embodiment, coalescing of a left sibling of a node being currently copied may be prevented during the copying of the node.

Further, in one embodiment, in response to determining that a copy operation has a lower priority than a coalesce operation, the coalesce operation may leave an emptied right node so that the copy operation, after copying the right node, may re-latch the right node, detect that it has been emptied, and restart the copy operation. The last user of an empty node may delete it.

Further still, in one embodiment, in response to determining that a copy operation has a higher priority than a coalesce operation, a coalesce operation involving a current node and a left sibling of the current node may wait while the copy operation is reading the current node.

Write-Prioritized Tree Copy

In one embodiment, a tree may be copied for various reasons such as for performing a checkpoint which copies all tree data from a point in time or later, or for performing a snapshot which copies all tree data from a single point in time.

A tree that is currently being copied for potential future restoration can affect a performance of concurrent updates being performed to the tree. For example, if a node is share-latched for a copy operation, an update operation must wait for the share-latch to be released before it can be granted an update-latch. User updates are generally considered higher priority than background system copies; however, in the case described priorities are reversed.

One solution is to simply wait for the update operation to complete. This solution is simple but it does not address the problem of performing lower priority work before higher priority work.

Another solution is to abort any lower-priority tasks so they free their latches as soon as possible. This adds complexity including support for the points at which a task may be aborted and the resuming of a task after higher priority tasks complete. This solution also requires that an update task wait some period of time for a latch to be released, as an abort is not instantaneous.

In one embodiment, each node may be copied without holding a latch. For example, a copy task first takes a share-latch to access a first node, copies its version number then unlatches the node. Then it copies the node. Then it share-latches then node again and if its version number indicates that it has been changed by an update operation, the copy must be redone as it may have been in an inconsistent state. A node is recopied until it is copied without concurrent modification.

Node Version Number

When a node is update-latched, its version number is incremented atomically. A completed copy operation compares its saved version to the value used before a copy. If the version numbers are equal the node is considered unchanged and the copy is considered successful. It is assumed that the node cannot be updated enough times while a copy is pending for the version number to be wrap back to its original value.

Node Iteration

After a node has been copied without a concurrent modification and share-latched again, the right sibling reference of the node is dereferenced and its right sibling is share-latched and the original node is unlatched. Iteration ends once a node without a right sibling is copied without a concurrent modification.

Node Coalesce

A node coalesce operation joins two adjacent nodes. It frees one node's memory and can reduce tree traversal time, but is not required to perform a user request unless the memory it frees is required to split a node for an insert operation.

A node, while being read for a copy operation, may coalesce with a right sibling or may split, which inserts a right sibling, because each requires that the same node be recopied to keep a copy operation's node cursor in its current position.

A node coalesce with its left sibling, while it is being copied, would effectively regress a copy task's node cursor. To avoid this, copy and coalesce operations could be serialized at a coarse granularity such as a tree. Or they could proceed concurrently wherein a copy operation update-latches a node before copying it to indicate it is being copied then unlatches it to copy and after the copy completes re-update-latches it and indicates that the copy is completed.

If a copy is considered lower priority than a coalesce, then a coalesce leaves an emptied right node so the copy task, after copying it, can re-latch it, detect it has been emptied, and restart. The last user of an empty node deletes it.

If a copy is considered higher priority than a coalesce, then a coalesce with a left sibling may wait while a copy may be reading a node.

In one embodiment, a method for copying a tree index is provided where for each node, a share-latch is taken to access the node, copy the version number, and unlatch the node, the node is copied, the node is again share-latched, and the version number is determined and compared to the copied version number, where if version numbers differ, the copy of the node and the share-latching is redone, and if the version numbers are the same, the node copy is complete.

In addition, a coalesce operation may be conducted, where a sequence of copying a portion of the nodes is considered an iteration. Further, if a predetermined priority indicates that a coalesce operation has a higher priority than a copy operation, the coalesce is performed and the copy operations and share-latches are redone, any empty node is detected, and the copy is restarted. If the predetermined priority indicates that a copy operation has a higher priority than a coalesce operation, the coalesce is delayed from being performed on a preceding node of the iteration sequence until the copy of the node is complete.

Figure 6:
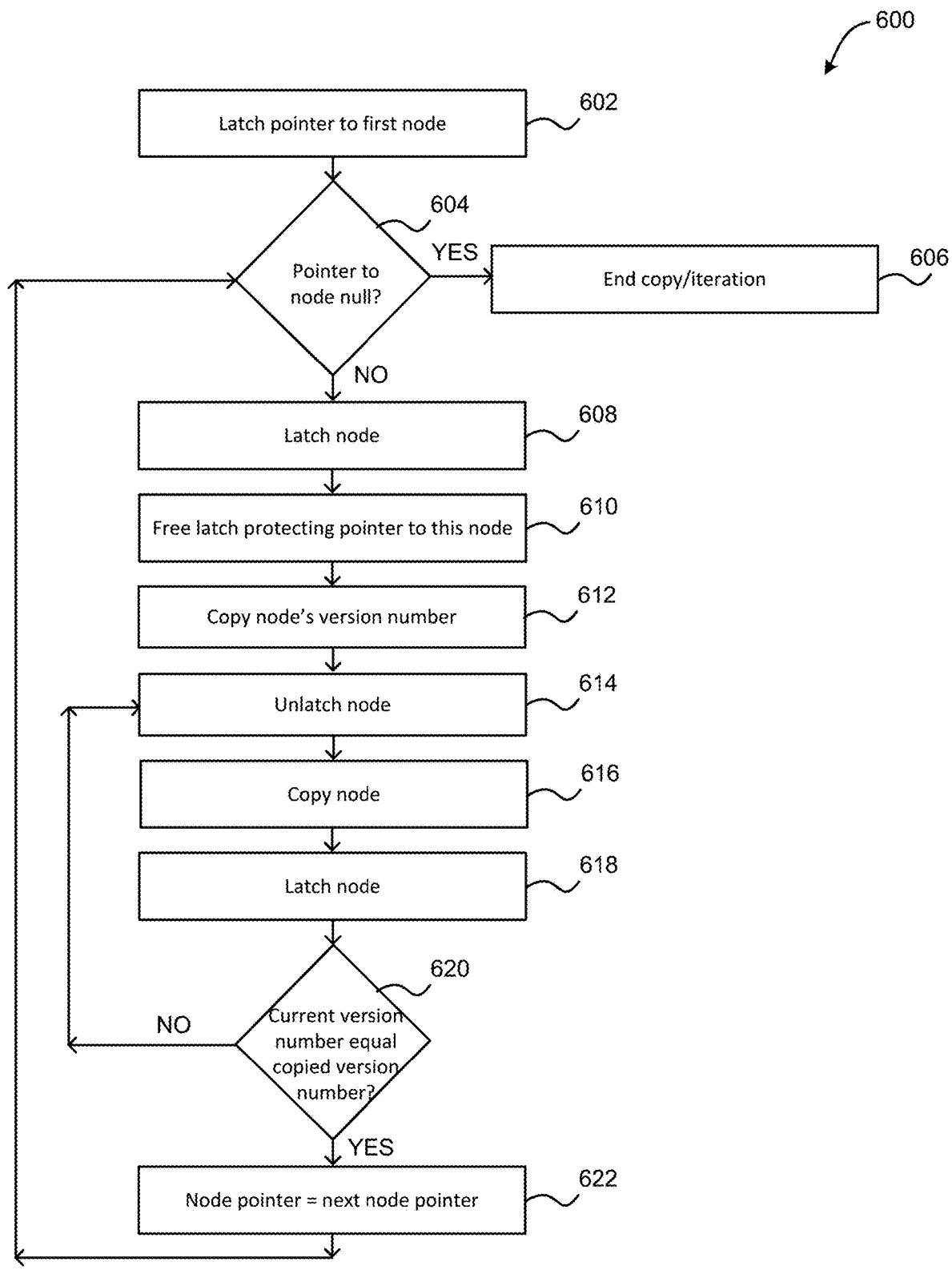
FIG. 6 illustrates another method for traversing a tree data structure during a tree copy, in accordance with one embodiment of the present invention.

Now referring to FIG. 6, a flowchart of another method 600 for traversing a tree data structure during a tree copy is shown according to one embodiment. The method 600 may be performed in accordance with the present invention in any of the environments depicted in FIGS. 1-3, among others, in various embodiments. Of course, greater or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a pointer is latches to a first node. Additionally, method 600 may proceed with decision 604, where it is determined whether the pointer to the node is null. If it is determined in decision 604 that the pointer to the node is null, then method 600 may proceed with operation 606, where the copy/iteration is ended.

Additionally, if it is determined in decision 604 that the pointer to the node is not null, method 600 may proceed with operation 608, where the node is latched. Additionally, method 600 may proceed with operation 610, where the latch protecting the pointer to the node is freed. Further, method 600 may proceed with operation 612, where the node's version number is copied.

Further still, method 600 may proceed with operation 614, where the node is unlatched. Also, method 600 may proceed with operation 616, where the node is copied. In addition, method 600 may proceed with operation 618, where the node is latched. Furthermore, method 600 may proceed with decision 620, where it is determined whether the current version number for the latched node equals the previously copied version number.

Further still, if it is determined in decision 620 that the current version number for the latched node equals the previously copied version number, then method 600 may proceed with operation 622, where the node pointer is incremented. The method then proceeds with decision 604, where it is again determined whether the pointer to the node is null. However, if it is determined in decision 620 that the current version number for the latched node equals the previously copied version number, then method 600 may proceed with operation 614, where the node is unlatched and a copy is performed again.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing a write-prioritized tree copy in a data storage system, comprising:
   obtaining a first latch for a first node within a tree data structure;
   copying a first version number of the first node while the first node is latched;
   unlatching the first node;
   copying the first node, including postponing a coalesce operation involving the first node and a left sibling of the first node while a copy operation is reading the first node, wherein the postponement occurs in response to determining that the copy operation has a higher priority than the coalesce operation;
   latching the first node a second time after completing the copying;
   copying a second version number of the first node while the first node is latched; and
   performing one or more actions in response to a comparison of the first version number and the second version number.

2. The computer-implemented method of claim 1, wherein performing the one or more actions includes:
   following a pointer from the first node to a second node within the tree data structure, in response to determining that the first version number matches the second version number;
   latching the second node;
   copying a third version number of the second node;
   unlatching the first node and the second node;
   copying the second node;
   latching the second node after completing the copying;
   copying a fourth version number of the second node; and
   performing one or more actions in response to a comparison of the third version number and the fourth version number for the second node.

3. The computer-implemented method of claim 1, wherein the tree data structure includes a data structure including a plurality of nodes that are used for a storage of sorted data.

4. The computer-implemented method of claim 1, wherein the first latch includes a shared latch that allows multiple concurrent readers.

5. The computer-implemented method of claim 1, wherein the first version number includes a current version number stored within the first node prior to copying the first node.

6. The computer-implemented method of claim 1, wherein copying the first version number includes identifying the first version number at a first storage location where the first version number is stored within the first node, and creating a copy of the first version number at a second storage location different from the first storage location.

7. The computer-implemented method of claim 1, wherein first latch is obtained atomically on a processor.

8. The computer-implemented method of claim 1, wherein:
   the first latch is obtained in response to receiving a request to copy the tree data structure, and
   the first latch is removed from the first node immediately after copying the first version number of the first node.

9. The computer-implemented method of claim 1, wherein the first node is copied without a latch being held on the first node during the copying.

10. The computer-implemented method of claim 1, wherein copying the first node includes creating a copy of all data stored within the first node.

11. The computer-implemented method of claim 1, wherein the second version number includes a current version number stored within the first node after the copying of the first node has been completed.

12. The computer-implemented method of claim 1, wherein in response to determining that the first version number matches the second version number, the copying of the first node is determined to be complete.

13. The computer-implemented method of claim 1, wherein in response to determining that the first version number does not match the second version number, the copying of the first node is determined to be incomplete.

14. The computer-implemented method of claim 1, further comprising managing node coalescing and node splitting within the tree data structure during the copying.

15. The computer-implemented method of claim 1, further comprising, in response to determining that the copy operation has a lower priority than the coalesce operation:
   leaving, by the coalesce operation, an emptied right node;
   copying, by the copy operation, the right node;
   re-latching, by the copy operation, the right node;
   detecting, by the copy operation, that the right node has been emptied; and
   restarting the copy operation.

16. A computer program product for performing a write-prioritized tree copy in a data storage system, the computer program product comprising a computer readable storage medium having program instructions embodied therewith, wherein the computer readable storage medium is not a transitory signal per se, the program instructions executable by a processor to cause the processor to perform a method comprising:

obtaining a first latch for a first node within a tree data structure;

copying a first version number of the first node while the first node is latched;

unlatching the first node;

copying the first node, including postponing a coalesce operation involving the first node and a left sibling of the first node while a copy operation is reading the first node, wherein the postponement occurs in response to determining that the copy operation has a higher priority than the coalesce operation;

latching the first node a second time after completing the copying;

copying a second version number of the first node while the first node is latched; and performing one or more actions in response to a comparison of the first version number and the second version number.

17. The computer-implemented method of claim 1, wherein:

the first version number includes a current version number stored within the first node prior to copying the first node, the first node is copied without a latch being held on the first node during the copying, and the second version number includes a current version number stored within the first node after the copying of the first node has been completed.

18. The computer-implemented method of claim 1, wherein:

the first version number includes a current version number stored within the first node prior to copying the first node, the first node is copied without a latch being held on the first node during the copying, the second version number includes a current version number stored within the first node after the copying of the first node has been completed, in response to determining that the first version number matches the second version number, the copying of the first node is determined to be complete, and in response to determining that the first version number does not match the second version number, the copying of the first node is determined to be incomplete.

19. A system for performing a write-prioritized tree copy in a data storage system, comprising:

a processor; and logic integrated with the processor, executable by the processor, or integrated with and executable by the processor, the logic being configured to:

obtain a first latch for a first node within a tree data structure;

copy a first version number of the first node while the first node is latched;

unlatch the first node;

copy the first node, including postponing a coalesce operation involving the first node and a left sibling of the first node while a copy operation is reading the first node, wherein the postponement occurs in response to determining that the copy operation has a higher priority than the coalesce operation;

latch the first node a second time after completing the copying;

copy a second version number of the first node while the first node is latched; and perform one or more actions in response to a comparison of the first version number and the second version number.

* * * * *